T. E. WILKINS.
STALK CUTTER.
APPLICATION FILED JUNE 1, 1921.

1,436,071.

Patented Nov. 21, 1922.
2 SHEETS—SHEET 1.

T. E. Wilkins, INVENTOR.

BY Geo. P. Kimmel, ATTORNEY.

T. E. WILKINS.
STALK CUTTER.
APPLICATION FILED JUNE 1, 1921.

1,436,071.

Patented Nov. 21, 1922.
2 SHEETS—SHEET 2.

T. E. Wilkins, INVENTOR.

BY Geo. P. Kimmel, ATTORNEY.

Patented Nov. 21, 1922.

1,436,071

UNITED STATES PATENT OFFICE.

THOMAS ESCOR WILKINS, OF CULLMAN, ALABAMA.

STALK CUTTER.

Application filed June 1, 1921. Serial No. 474,067.

*To all whom it may concern:*

Be it known that I, THOMAS ESCOR WILKINS, a citizen of the United States, residing at Cullman, in the county of Cullman and State of Alabama, have invented certain new and useful Improvements in Stalk Cutters, of which the following is a specification.

This invention relates to stalk cutters, and more particularly to that class of detachable devices adapted to be mounted on a conventional type of cultivator beam.

The primary object of the invention resides in a novel and improved rotatable stalk cutter and mounting therefor permitting the adjustment of said cutter with respect to the supporting beams to regulate the desired cut of the blades during the travel of the cultivator.

Another and very important object of the invention is the provision of a stalk cutter designed for use and adapted to be mounted on practically any type of cultivator, and one in which the parts are extremely simple in construction, easily assembled, rigid and durable, highly efficient in operation, practical and capable of being manufactured at a very low cost whereby its commercial possibilities are greatly enhanced.

With these objects in view, and others which will be suggested and manifest as the purpose and nature of my invention are revealed in the following specification and drawing wherein I have shown a preferred embodiment thereof, Figure 1 is a side view showing the invention as applied to a conventional type of cultivator.

Figure 1:
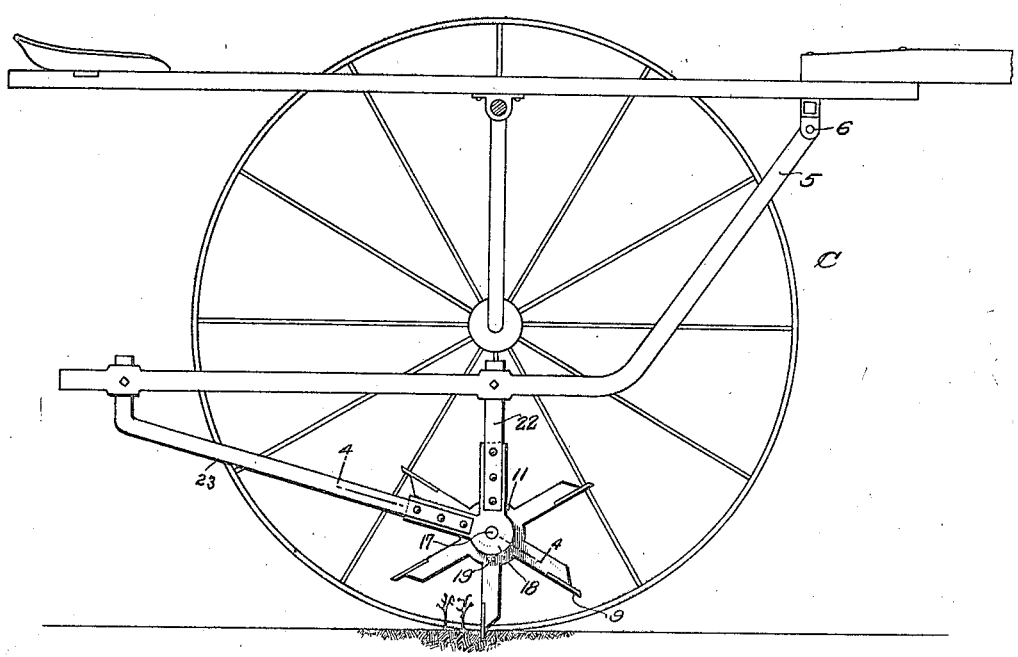
Figure 6:
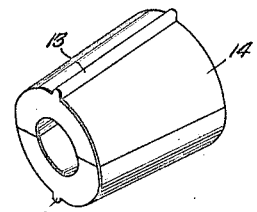
Fig. 6 is a perspective view of a sectional bearing.
Figure 5:
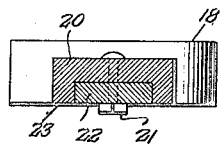
Fig. 5 is a detail section taken on the line 5—5 of Fig. 4.

Reference being had now to the drawings, wherein like parts designate corresponding parts in the specification, C designates a conventional type of wheeled cultivator wherein the supporting beams 5 are suitably mounted as at 6 to the main beam of the cultivator and extends downwardly and rearwardly thereof for the mounting of the stalk cutter in the manner more clearly shown by Fig. 1.

Figure 2:
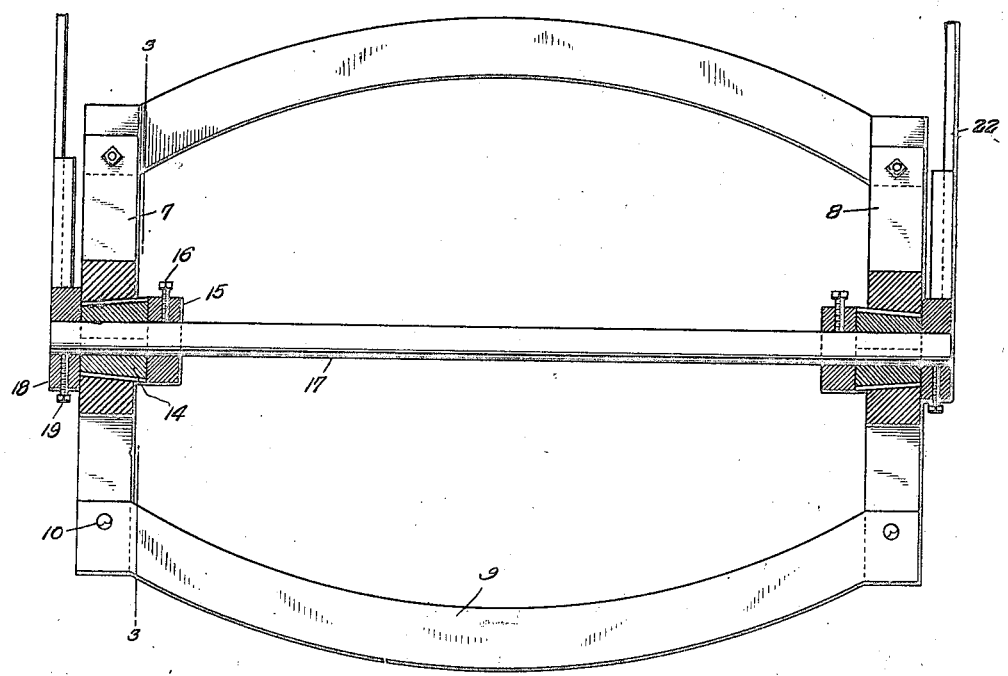
Fig. 2 is a front view showing the detached cultivator and its novel mounting.
Figure 3:
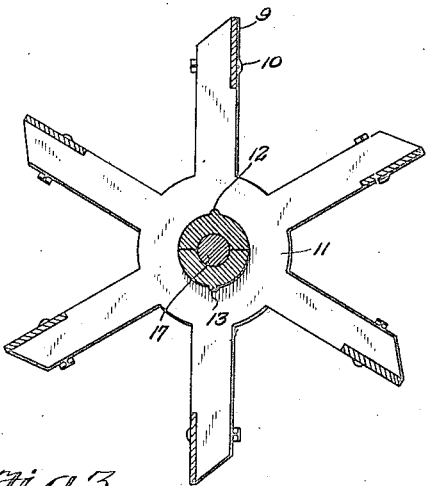
Fig. 3 is an end view of the cutter taken on the line 3—3 of Fig. 2.
Figure 4:
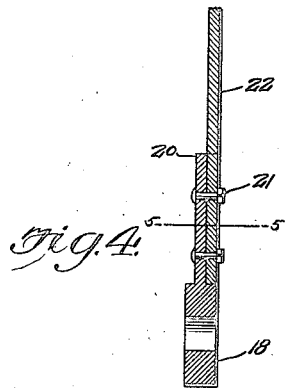
Fig. 4 is a sectional view taken on the line 4—4 of Fig. 1.

The stalk cutter proper consists of the end spiders 7, 8, wherein the arms thereof are partly cut away near their ends to receive the curved cutting blades 9 which are secured thereto by suitable fastening elements 10, it being of course understood that said blades are sharpened to present curved cutting edges which engage the stalks below the surface of the ground as is the common practice. The hubs 11 of each of the spiders are provided with grooves 12 therein which are adapted to receive the raised projections 13 formed on each of the sectional, tapered bearings 14 held in position within the hubs of the spiders by the collars 15, the usual set screw 16 being provided for that purpose. The shaft 17 of the cutter, which extends through the tapered, sectional bearing 14, is provided on its outer ends with collars 18 also held in position by the set screws 19, said last mentioned collars 18 having formed integral therewith, the extensions 20 which are bolted or otherwise secured as at 21 to the vertically extending supporting arms 22, 23, the latter extending one upwardly and the other rearwardly and upwardly to the beams 5, said arms being vertically adjustable with respect to the supporting beams in any well known manner. The extensions 20 of said collars 18 which are flanged as shown at 23 to receive the ends of the angularly extending supporting arms 22, permit the said supports 22 to lie flush with the sides of the said extensions, the said bearings 14 being adjustably held between the respective collars by the set screws above referred to and as clearly shown by Fig. 2 of the drawing.

In the above construction, it will be readily apparent that the cutter may be mounted with its bearings regardless of the length of the shaft 17 and that the cutter blades may easily be removed and replaced on the arms of the respective spiders when it is desired to replace or sharpen any one of the blades as is well understood. In the accompanying drawings, I have illustrated my invention embodied in one form by way of example, and which in practice has been found to be highly satisfactory in obtaining the desired results. It will be obvious however that other embodiments may be adopted and that various changes in the details of construction may be resorted to by those skilled in the art without departing from the spirit and scope of the invention. It is furthermore understood that the invention is not necessarily limited or restricted to the precise elements shown except in so far as such limitations are specified in the subject matter being claimed.

Having shown and described the invention, what I claim as new and desire to secure by Letters Patent of the U. S. is:—

A stalk cutter of the class described comprising a stationary shaft, a rotary cutting member supported for rotation thereon, said rotary member consisting of end spiders having six arms, the outer ends of which are beveled toward the face carrying the cutting members, recesses formed in the faces of each of the arms to receive curved cutting knives, collars mounted upon said stationary shaft, and abutting bearing members carried by the spiders, means for adjusting said collars to prevent movement of the cutting member upon the shaft, supporting members adapted to receive the ends of the aforesaid shaft, means carried by said supporting members for holding said shaft stationary, a pair of channeled arms formed integral with said supporting members and adapted to receive a vertical and an upwardly and rearwardly extending member, the ends of these members terminating in a downwardly and rearwardly extending member carried by the main frame.

In testimony whereof, I affix my signature hereto.

THOMAS ESCOR WILKINS.